March 23, 1954 G. ROBINSON 2,672,894
LOOM
Filed Jan. 5, 1952 10 Sheets-Sheet 5

INVENTOR.
Graydon Robinson
BY
Moser, Nolte, Crews & Berry
ATTORNEYS

Fig. 10.

March 23, 1954     G. ROBINSON     2,672,894
LOOM
Filed Jan. 5, 1952     10 Sheets-Sheet 9

Fig. 12. (Continuation of Fig. 11.)

x = Roller
• = Sinker

INVENTOR.
Graydon Robinson
BY
ATTORNEYS

March 23, 1954 G. ROBINSON 2,672,894
LOOM
Filed Jan. 5, 1952 10 Sheets-Sheet 10

Fig. 13.

INVENTOR.
Graydon Robinson
BY
Moses, Nolte, Crews & Berry
ATTORNEYS

Patented Mar. 23, 1954

2,672,894

UNITED STATES PATENT OFFICE 2,672,894

LOOM

Graydon Robinson, Lebanon, Tenn., assignor to Lebanon Woolen Mills, Lebanon, Tenn., a corporation of Tennessee Application January 5, 1952, Serial No. 265,089

10 Claims. (Cl. 139—325)

1

This invention relates to looms, and more particularly to head motions and similar mechanisms used in looms to produce special weaves which cannot be practically made in an automatic manner in looms of previously known construction.

The present invention has for its primary object to produce automatically, and by simple, efficient and inexpensive harness control mechanism, patterns which will not be completely repetitive for a number of picks far beyond the capacity of conventional looms.

It is a further object to achieve the foregoing results through modification of a standard Crompton and Knowles loom, effected by the removal of some parts, simple alteration of some of the parts retained, and the addition of other parts which are of standard construction.

More specifically, the invention resides in the addition to the usual harness and harness control mechanism for the warp threads which follow a simple pattern of a novel harness control involving interacting multiplying and reversing chains for special warp thread harnesses which are required by the pattern to be governed by a more complex and extended law of variation.

It is a further object to provide a common control for the shuttle boxes and the special harness chains.

It is a particular feature of the invention that the standard loom can be modified in a simple and expeditious manner to embody the present improvement and can be restored to standard construction with equal facility.

Other objects and advantages will hereinafter appear.

In the drawing forming part of this specification:

Figure 4 is a fragmentary sectional front view taken upon the line 4—4 of Figure 2, looking in the direction of the arrows;

Figure 5 is a fragmentary sectional view taken upon the line 5—5 of Figure 2, looking in the direction of the arrows;

Figure 6 is a fragmentary sectional view taken

2 upon the line 6—6 of Figure 2, looking in the direction of the arrows;

In order that the description of the mechanism may be more easily followed and understood, there is disclosed herein an electric blanket shell 100 which is representative of the kind of work done by the loom embodying the present invention. This blanket shell will first be described, since an understanding of the requirements will indicate the nature of the problem involved and will facilitate an understanding of the measures taken for the solution of the problem.

Figure 10:
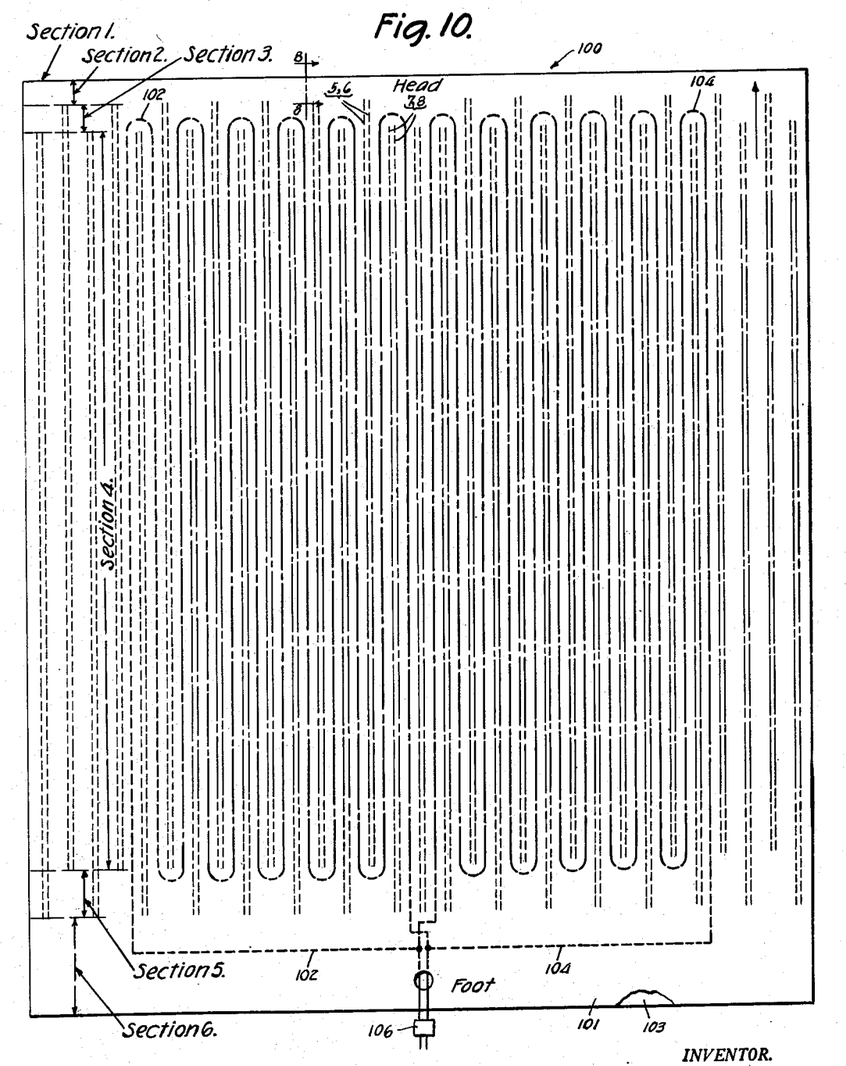
Figure 10 is a plan view of the illustrative electric blanket, complete except for binding of the head and foot.

The blanket shell 100 is shown generally in Figure 10. Details of the blanket shell are shown on a larger scale in Figure 8. The blanket shell will be referred to in extreme detail in some instances in order that the illustration may be entirely clear. Such detailed reference is to be understood as intended merely for clarification of the illustration, and not as restricting the scope of the invention.

The blanket shell 100 is woven in tubular form with the upper and lower layers 101 and 103 completely free from one another between the side edges at the head and foot, but bound together by certain of the warp threads designated 5, 6 and 7, 8 in other sections of the length, so that longitudinal channels or ducts are defined between bindings for receiving electrical heating resistors 102 and 104.

Three shuttles are employed in weaving the illustrative blanket, one containing filler thread of a distinctive color which is used for just two picks in each blanket to mark an end thereof, and the others containing threads similar to one another which will be referred to as white threads. The loom includes three shuttle boxes at one side and one at the other. The first side is regarded as the home side, where the shuttles rest, and the picks will be referred to as outward and return picks from that point of view.

The blanket weaving progresses uninterruptedly from blanket to blanket. For illustrative purposes the first pick is assumed to be a white thread, upper layer return pick. The colored thread shuttle next executes an upper layer, outward pick and a lower layer, return pick. One of the white thread shuttles next executes a lower layer, outward pick and an upper layer, return pick. The other white thread shuttle then executes an upper layer, outward pick and a lower layer, return pick. Continuing, the white thread shuttles act in alternation. One of them goes out through the upper layer at its first pick and returns through the lower layer at its second pick. The other white thread shuttle then goes out through the lower layer at its first pick and returns through the upper layer at its second pick. As a result, one of the white filler threads describes a continuous right hand flattened spiral, while the other describes a continuous left hand flattened spiral. The white filler threads cross one another as they pass from layer to layer at the home side of the loom, connecting the layers to one another at that side.

The first section consists of only six picks and is too narrow to be distinguished from the upper boundary line in Figure 10. Section 1 of the blanket is distinguished from section 2 by the fact that it includes the two colored picks. Section 2 comprises 34 picks. Throughout sections one and two each warp thread is controlled in a uniform manner. Each warp thread is confined to one of the layers and is caused through harness control to extend alternately over and under successive individual filler threads of that layer. At four successive picks the filler thread passes under only alternate upper layer warp threads, over only alternate lower layer warp threads, over only the other alternate lower layer warp threads, and under only the other alternate upper layer warp threads. The four picks just described would correspond, for example, to picks 2 to 5, 6 to 9, etc.

Up to the end of the second section the warp threads which are involved in the regular weave throughout the length of the blanket and the warp threads which do the binding in certain sections are all caused to follow the regular weave pattern. With the beginning of section 3 a difference condition arises. It is important at this point, therefore, to differentiate between the regular weave warp threads and the binding warp threads.

The warp thread content of the upper layer consists principally of regular weave warp threads 1 and 2, controlled in the loom by harnesses 1 and 2, respectively, while the warp thread content of the lower layer consists principally of warp threads 3 and 4 controlled in the loom by harnesses 3 and 4. The harnesses for these threads follow a four step repetitive pattern throughout, and their control presents no problem. They are desirably controlled by a short harness chain which runs always in the same direction and which contains a number of bars which is a convenient multiple of four. They impose only one requirement, that the total number of picks in the entire pattern (one blanket length), shall be a multiple of four.

The regular weave warp threads are arranged repetitively in 1, 2, 3, 4 order from side to side of the loom, with the exceptions which will now be noted. In certain binding zones a thread 5, controlled by binder harness number 5, occupies the space which, in the normal sequence, would be occupied by a thread 2, and a thread 6, controlled by binder harness number 6, occupies the space which, in the normal sequence, would be occupied by a thread 3. In other binding zones a thread 7, controlled by binder harness number 7, occupies the space which, in the normal sequence, would be occupied by a thread 2, and a thread 8, controlled by binder harness number 8, occupies the space which, in the normal sequence, would be occupied by a thread 3. Thus, in sections 1 and 2 where no binding is done, the pattern control for the number 5 and 7 harnesses must be the same as for the regular number 2 harness and the pattern control for the number 6 and 8 harnesses must be the same as for the regular number 3 harness.

In section 3 binder harnesses 5 and 6 are made to follow a different rule or pattern of control so that threads 5 and 6 will be caused to bind the layers to one another. Binder harnesses 7 and 8, however, cause the threads 7 and 8 to continue like 2 and 3, according to the regular weave pattern. Section 3 includes 120 picks.

In section 4 harnesses 7 and 8, as well as 5 and 6, cause binding to be effected. This section comprises 2,408 picks. It is in this section that the heating resistors are almost completely contained when the blanket is finished.

In section 5 the harnesses 5 and 6 resume the regular weave pattern, but the harnesses 7 and 8 continue to cause binding to be effected by the threads 7 and 8. Thus, the binding seams formed by threads 5 and 6 begin earlier than the binding seams formed by threads 7 and 8, and terminate earlier. Section 5 comprises 184 picks.

In section 6 all the harnesses cause regular weaving to be effected, the binder harness control being similar to that of sections 1 and 2. Section 6 comprises 304 picks. This section is designed to be tucked in at the foot of the bed.

When the shell has been woven and cut into blanket lengths, each blanket 100 may be completed by the insertion of electric heating resistors 102 and 104 and by applying the usual binding. The resistor 102 is inserted from the foot into one of the two central channels or ducts and is lead back and forth through one duct after another until it is finally brought back to the foot through one of the larger ducts at the left. The resistor 104 is similarly inserted in the right hand side of the blanket. The terminal end of each resistor is attached to the entering end of the other, and the entering ends are connected to opposite terminals of a plug 106 through a temperature control device (not shown).

The blanket is then completed by applying the usual binding (not shown) at the head and foot of the blanket. Several of the channels along the right and left margins of the blanket shell are left empty. No heating is required in these margins because they simply hang down at opposite sides of the bed. The binding provided in these side margins helps to keep the side margins of the layers in good order with respect to one another.

The entire illustrative blanket includes 3,056 picks. The binding harnesses and the shuttle boxes are required to pursue a control pattern which is not completed and ready for repetition in its entirety until 3,056 picks have been executed. Answering this and similar requirements by simple, efficient and inexpensive means, is the purpose of the present invention. This has been achieved by devising simple mechanism through which the binder harness and box chains are caused in unison to travel back and forth repeatedly as the weaving is executed in sections 2, 3, 4, 5 and 6 of the blanket.

Figure 2:
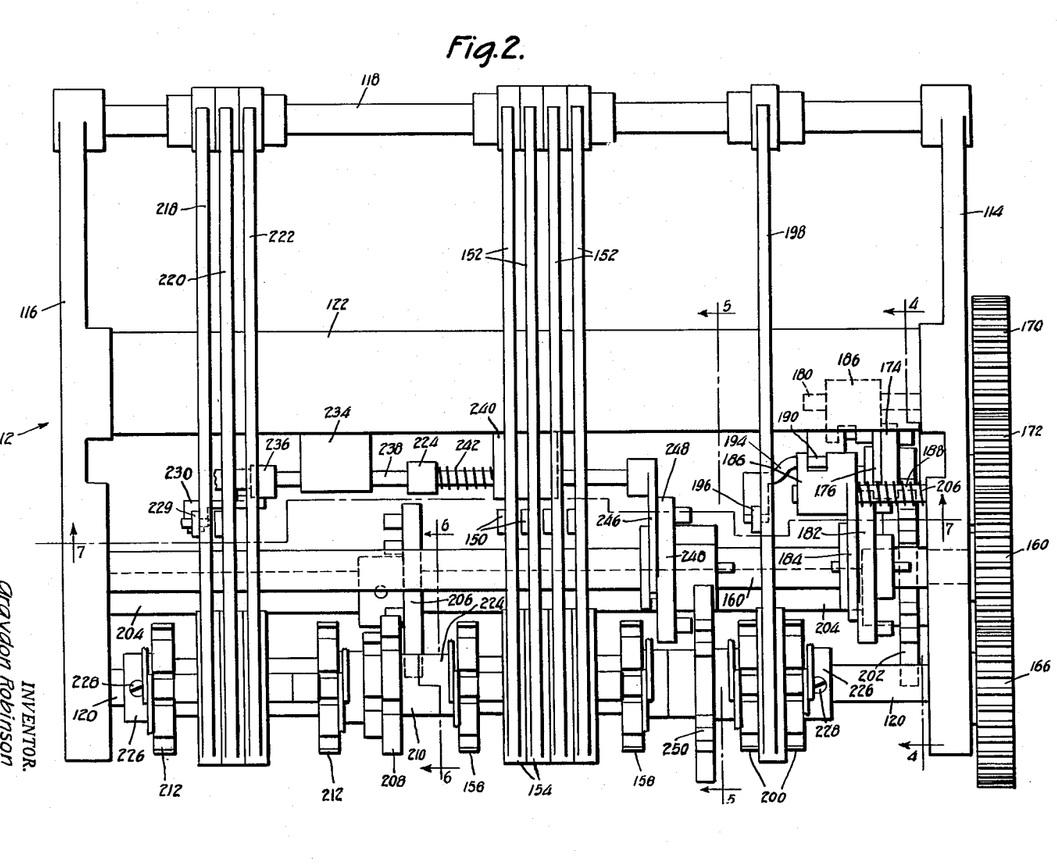
Figure 2 is a plan view of the improved control mechanism which is applied to the shuttle box and the binding harnesses.
Figure 3:
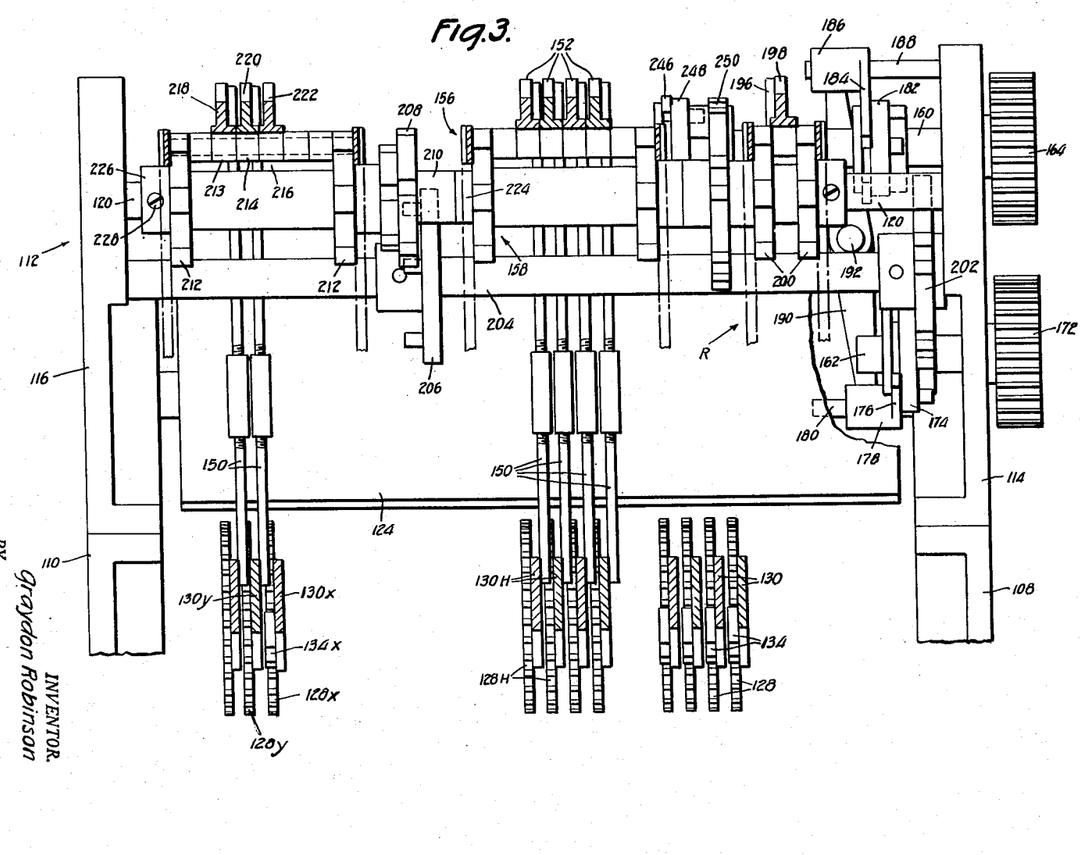
Figure 3 is a fragmentary view in sectional side elevation showing particularly a novel head attachment applied to the machine, in which most of the novel control mechanism is included.

The invention is illustrated as embodied in a drop box loom having a Knowles head for operating the regular harness; i. e., the four harnesses for controlling the regular weave through which warp threads 1 to 4 are raised and lowered. The loom includes front and rear frame members 108 and 110 upon which an auxiliary frame 112 is supported (Fig. 3). The auxiliary frame comprises front and rear frame members 114 and 116 which are supported respectively upon the main frame members 108 and 110. The frame 112 also includes cross connectors 118, 120 and 122, of which 118 and 120 are stationary shafts (Fig. 2). The auxiliary frame 112 carries the novel control mechanism of the present invention.

Figure 9:
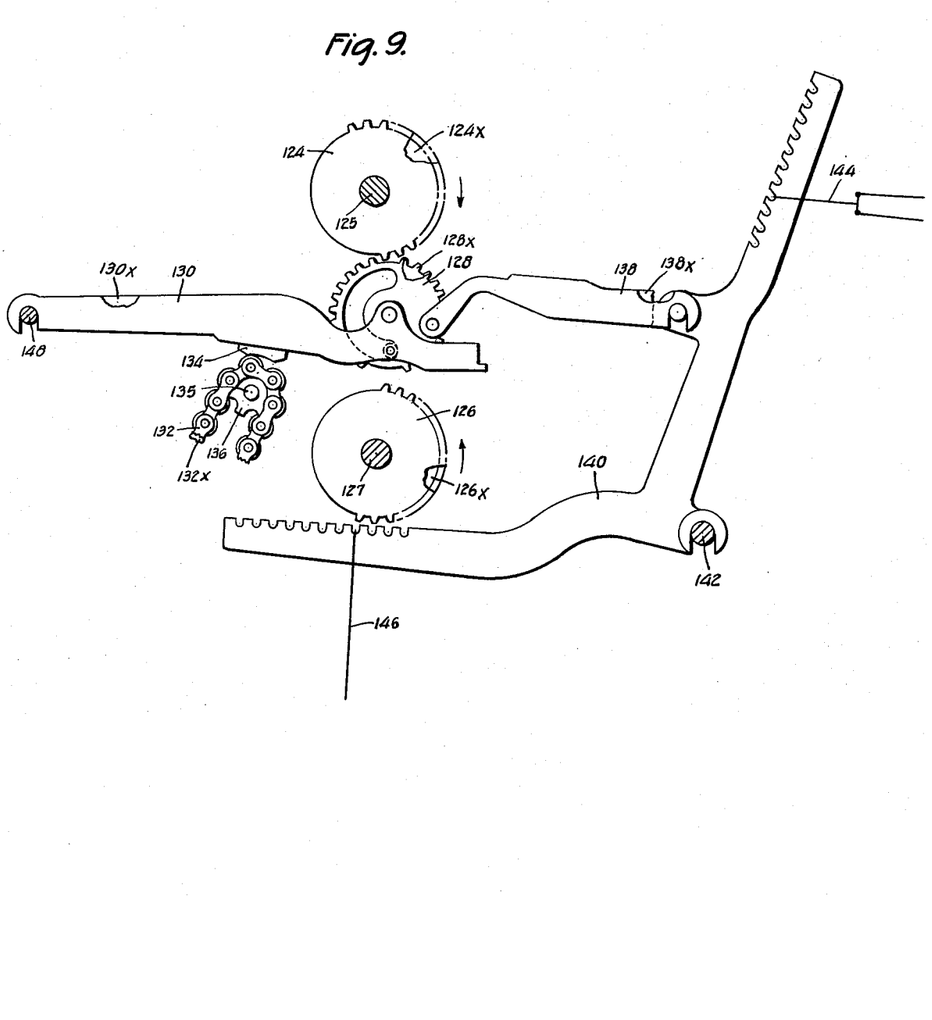
Figure 9 is a fragmentary view similar to Figure 1 and showing the unmodified or regular harness control mechanism employed in connection with a portion of the warp threads.

The normal harness and harness-operating mechanism in a machine of this kind, and the operation thereof are well understood. A typical unit is illustrated in Figure 9. A top cylinder gear 124 and a bottom cylinder gear 126 rotate constantly and equally in opposite directions, as shown by the arrows. Between these cylinder gears is a mutilated gear 128 (one for each harness) which is rotatively supported by a vibrator lever 130. A harness chain 132 consisting of bars upon which rolls and sinkers are mounted, causes this gear to be raised or lowered in preparation for each pick. This control is exercised for each harness through a run 134 on the vibrator lever 130.

The chain runs on a gear 136 which is driven intermittently to bring a fresh bar under the run 134 between each two consecutive picks. As is well understood, raising of the lever 130 by a roll causes gear 128 to be lifted into mesh with the gear 124 as shown in Figure 9, and then to be driven to its counter-clockwise limit of movement by the gear 124. The gear 128 is thus caused to act through a connector 138 to rock a jack 140 counterclockwise about a jack pin 142. The jack 140 acts through the usual connecting mechanism, including straps 144 and 146, to control an associated harness. When the vibrator gear is turned counter-clockwise as described, the harness is raised. When a sinker comes under the run 134, the vibrator lever 130 drops down and places the vibrator gear 128 in mesh with the gear 126. This causes the gear 128 to be turned to its clockwise limit, and this in turn causes the associated harness to be lowered. Thus, a roll causes the harness to be raised and a sinker causes the harness to be lowered.

Ordinarily there is just one control chain for the harnesses, there being a column of rolls and sinkers for each harness employed. Since all these rolls and sinkers are carried upon a single chain, the harnesses are necessarily controlled step by step in harmony with one another. The single chain is advanced one bar between each two successive picks. The harness chain may be varied to produce different weaves and can be made long enough to repeat a pattern of moderate length. Harnesses 1, 2, 3, 4 of the present machine, when used for the illustrative purposes, are controlled from a single harness chain as described.

Figure 1:
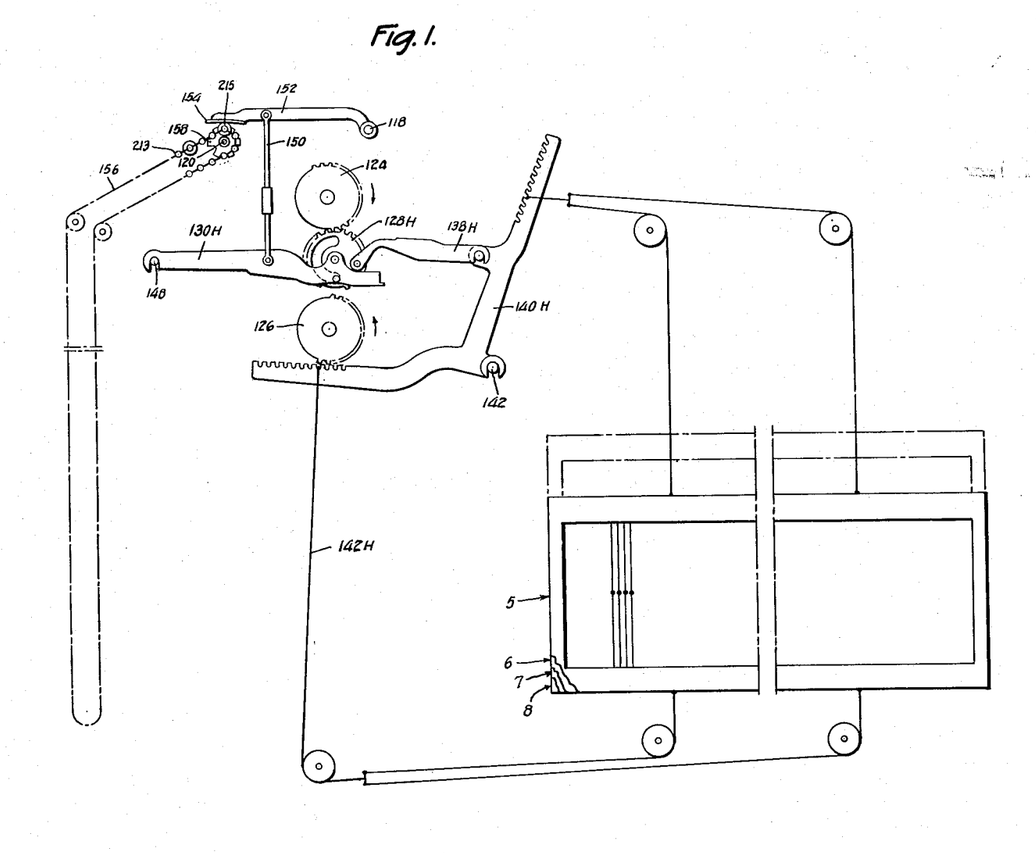
Figure 1 is a sectional view in front elevation showing a typical special harness and a portion of the control mechanism therefor.

In Figure 1 disclosure is made of a typical binding harness, say 5, and the operating mechanism therefor. The operating mechanism is similar to the mechanism of Figure 9 and operates in a similar manner. It includes a vibrator lever 130H, a vibrator gear 128H cooperative with the cylinder gears 124 and 126, a connector link 138H, a jack 140H pivoted on a jack pin 142, and connector straps 144H and 146H. All of these parts are standard parts of the Crompton and Knowles loom and are duplicates of the corresponding part of Figure 9, with the exception of vibrator lever 130H.

The vibrator lever 130H is similar in location and mounting, and in function, to the vibrator lever 130. It is pivoted on the same heel pin 148 as the vibrator lever 130. It is not, however, intended to be directly chain-actuated from underneath. It does not, therefore, necessarily have any run provided upon it and it is pivotally connected to an actuating link 150 through which it is controlled from overhead. The link 150 extends upward from the lever 130H and is pivotally connected at its upper end to an operating lever 152. The lever 152 is one of several similar levers which are pivotally supported on the stationary shaft 118 of the auxiliary or upper frame 112, there being one of these levers for each binder harness gear.

Each lever 152 is equipped with a run 154 for cooperating with a column of rolls and sinkers of a binder harness chain 156 which is of usual construction. The chain 156 cooperates with the runs 154 in the usual way, but it runs upon a gear 158, rotatively mounted on the shaft 120, which is arranged to be driven step by step in opposite directions by the novel control mechanism of the present invention.

Figures 4, 5, 6:
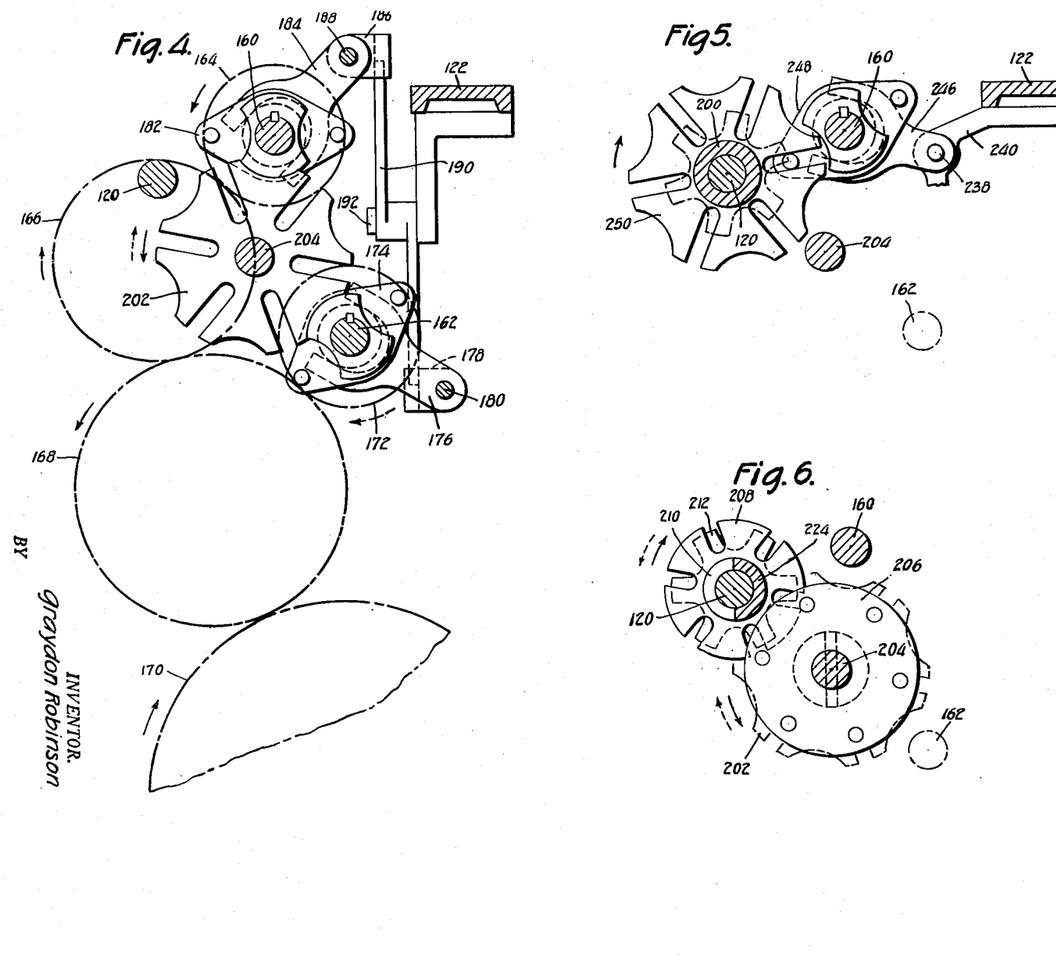

The novel control mechanism comprises two continuously rotating drive shafts 160 and 162 (Fig. 4). The drive shaft 160 is connected through a train of gears 164, 166 and 168 to a driving gear 170 which is driven in timed relation to the cylinder gears of the Crompton and Knowles head. The drive shaft 162 is driven through a gear 172 which meshes directly with the gear 168 previously referred to. With these connections the shafts 160 and 162 are caused to be continuously rotated at equal speed but in opposite directions. Each makes one complete turn for every two picks.

A two toothed driver or pin gear 174 is slidable on the shaft 162 but is keyed or otherwise secured to the shaft, so as to be continuously rotated by the shaft. The hub of the pin gear 174 is grooved to receive a yoke arm 176 on a collar 178, the collar being slidable on a fixed stud 180. A two toothed pin gear 182 is similarly slidable on the shaft 160 and is continuously rotated by the shaft 160. The hub of the pin gear 182 is grooved to receive a yoke arm 184 on a collar 186 which collar is slidable on a fixed stud 188.

Figure 7:
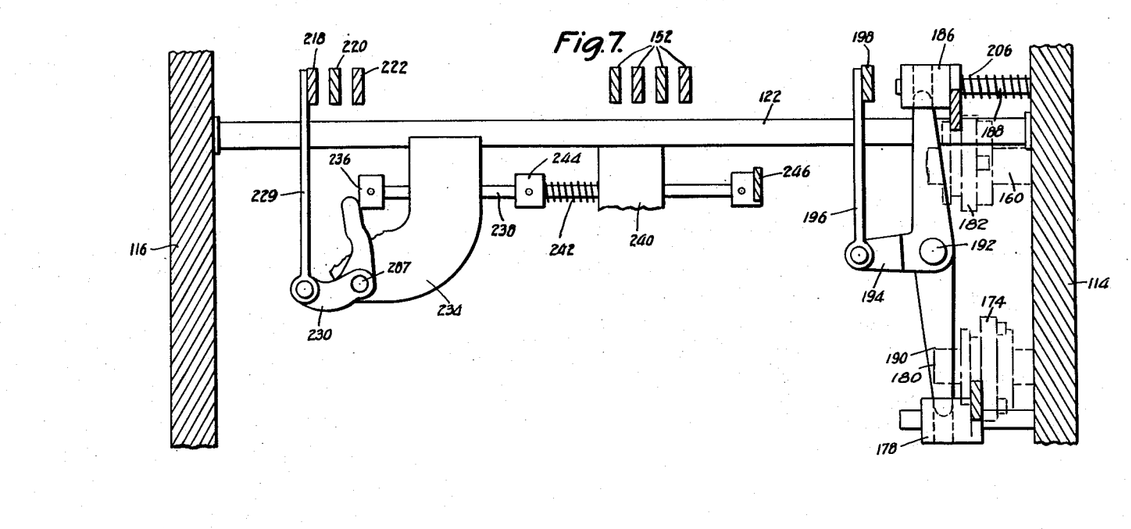
Figure 7 is a fragmentary sectional view taken upon the line 7—7 of Figure 2, looking in the direction of the arrows.

The collars 178 and 186 are grooved to receive opposite ends of a lever 190, mounted on a fixed pivot 192, and having a laterally projecting arm 194 (Fig. 7). The arm 194 is connected by a link 196 to a lever 198 which is pivoted on the cross shaft 118.

A reversing chain R is trained upon a gear 200, the gear being rotatively supported on the stationary shaft 120. The chain is equipped with rolls and sinkers for controlling the raising and lowering of the lever as required. As the lever 198 is raised and lowered under the control of the reversing chain R, the lever 190 (see Fig. 7) is rocked about pivot 192, to cause shifting forks 178 and 186 to move the pin gears 174 and 182, longitudinally of their shafts, alternatively into position to engage and drive a star wheel 202 which is fast upon a shaft 204 (see Fig. 4). Consequently, the shaft 204 is operated one step for every pick, but the direction of rotation is controlled by the reversing chain R. A spring 206 normally maintains the parts in the positions illustrated in Figures 2 and 7, with the pin wheel 174 in position to engage the star wheel 202.

The shafts 160 and 162 are timed, as previously noted, to make one revolution for each two complete pick cycles of the loom. The Geneva design is such that the active pin wheel acts through one quarter turn to drive the star wheel one step, locks the star wheel stationary during the second quarter turn, again drives the star wheel forward during the third quarter turn, and again locks the star wheel stationary in the final quarter turn. Thus, the star wheel is turned and locked during alternate half pick cycles, the direction of turning depending upon which of the two pin wheels is active. The direction of the drive can be changed after any driving step.

The shaft 204 has fast upon it a pin wheel 206 having six pins through which a six notched star wheel 208 is driven. The star wheel 208 is rotatively mounted upon the shaft 120. The star wheel is turned one step for each step of the shaft 204. It turns while the shaft 204 is turning and rests while the shaft is resting, the intervals of turning and of resting being equal in duration. The star wheel 208 is fast upon a hollow shaft 210, Figs. 2 and 6, which shaft is rotatively mounted upon the stationary shaft 120. The hollow shaft 210 forms a hub for a chain driving gear 212, by which a control and box chain having three columns 213, 214 and 216 of rolls and sinkers (Fig. 3) is driven. For the making of electric blanket shells the column 216 consists only of sinkers, and is without function. It is made available for other purposes. The rolls and sinkers of columns 213, 214 and 216 are provided to cooperate with runs on levers 218, 220 and 222, respectively, which levers are like the levers 152 and are similarly pivoted on the stationary shaft 118. The lever 222 remains idle and performs no function in the making of electric blankets.

The levers 220 and 222 are provided for controlling shuttle box mechanism (not shown). A suitable form of shuttle box control mechanism, and the operation thereof, is shown and described in American Wool Handbook, 2nd edition, of Textile Book Publishers, Inc., New York, at pages 671-3. To this statement there is one exception which will be pointed out at a subsequent point. The purpose and effect of the lever 218 will be explained presently.

The gear 158 by which the binder harness chain 156 is driven includes a hollow hub or sleeve portion 224 which is rotatably mounted on the stationary shaft 120. The hubs 210 and 224 are cut away as shown along diametrically and transversely extending planes, to provide rectangular, interfitting projections and notches at the end of the hubs. The several gears on the shaft 120 are held together against relative axial movement between collars 226, which collars are secured in fixed positions on the stationary shaft 120 by any suitable means such as set screws 228. The interfitted notches and projections compel the gear 158 to turn in unison with the gear 212. The chains for controlling the binder harness, the shuttle box and the lever 218 are, therefore, all reversible and are all driven in unison, the direction of drive depending upon the direction of drive of the star wheel 202 and the shaft 204 upon which the star wheel is made fast.

The lever 218 is connected through a link 229 (Fig. 7) with one arm of a bell-crank lever 230. The lever 230 is pivoted at 287 upon a stationary bracket 234. The opposite arm of the lever 230 extends upward and bears against the left hand side of a collar 236 which is affixed to the left end of a slide rod 238. The rod 238 is slidingly mounted in the bracket 234 and in a further stationary bracket 240. The rod is urged toward the left by a compression coil spring 242, which surrounds the rod and bears at its opposite ends against the left hand side of the bracket 240 and against the right hand side of a collar 244 fixed on the slide rod. The rod has fixed on its right hand end a shifting fork 246.

The fork 246 enters a circumferential groove which is formed in the hub of a pin wheel 248. The pin wheel 248, which has two pins, is slidable along, but keyed to, the constantly rotating shaft 160. The wheel 248 is provided for at times driving a star wheel 250 step by step. Since the shaft 160 runs always in the same direction, the star wheel 250 is never reversed but turns in the same direction whenever it turns at all.

In Figures 2 and 3, a sinker is under the run of the lever 218. The lever 218 is down, therefore, and the rod 238 is thrust leftward by the spring 242 and holds the pin wheel 248 in a disengaged position so that the star wheel 250 is idle. When a roll is under the lever 218, the lever is raised and, through link 229 and bell-crank 230, forces the rod 238 to the right to engage the pin wheel 248 drivingly with the star wheel 250, as in Fig. 5. The design of the pin wheel 248 and the star wheel 250 is the same as that of the pin wheel 174 or 182 and the star wheel 202. Hence the pin wheel 248, when in driving position, drives the star wheel forward during a first quarter turn, causes the star wheel to stand idle during a second quarter turn, drives the star wheel forward during a third quarter turn, and causes the star wheel to stand idle during the fourth quarter turn. This sequence corresponds to two complete pick cycles of the loom. The angular disposition of the pin wheel 248 on the shaft 160 is so chosen that the star wheel 250, when active, always turns while the star wheel 202 is at rest and is always at rest while the star wheel 202 is turning. In other words, the star wheels 202 and 250 can be turned only in alternate half pick cycles.

The star wheel 250 is fast with the hub 252 of the gear 260 through which the reversing chain R is driven and constitutes the driver for said chain. As previously pointed out, the lever 198 is under the control of the reversing chain, being down when a sinker of the reversing chain is in the effective position and up when a roll of the reversing chain is in the effective position. When the lever 198 is down, the pin wheel 174 is made effective to drive the star wheel 202, and this causes the chain gear 212 to be driven in a forward direction. When the lever 198 is up, the pin wheel 182 is effective to drive the star wheel 202 and this causes the chain gear 212 to be driven backward.

Since the gears 212 and 136 run in unison, the chains driven by them necessarily run in unison. One of these chains includes the column of rolls and sinkers by which the lever 218 is controlled to cause the reversing chain R to be advanced or to be held idle. The reversing chain in turn determines whether the gears 212 and 136 shall be turned in forward or backward direction.

The gears 212 and 136 move a step in one direction or the other during the first half of every pick cycle. The gear 200, if it moves at all, moves forward a step in the second half of a pick cycle. Thus, during the first half of a pick cycle, the harness will be set for the ensuing pick. At the same time the connections are established for determining whether the reversing chain R will advance or remain idle. During the second half of the pick cycle, the shuttle is actuated and the reversing chain is either advanced a step or held at rest according to whether a roll or a sinker is effective under the lever 218. What condition is established by the operation or nonoperation of the reversing chain during the second half of a pick cycle determines the direction in which the binder harness chain and the shuttle box and control chain will run during the next ensuing pick cycle.

Figures 11, 12:
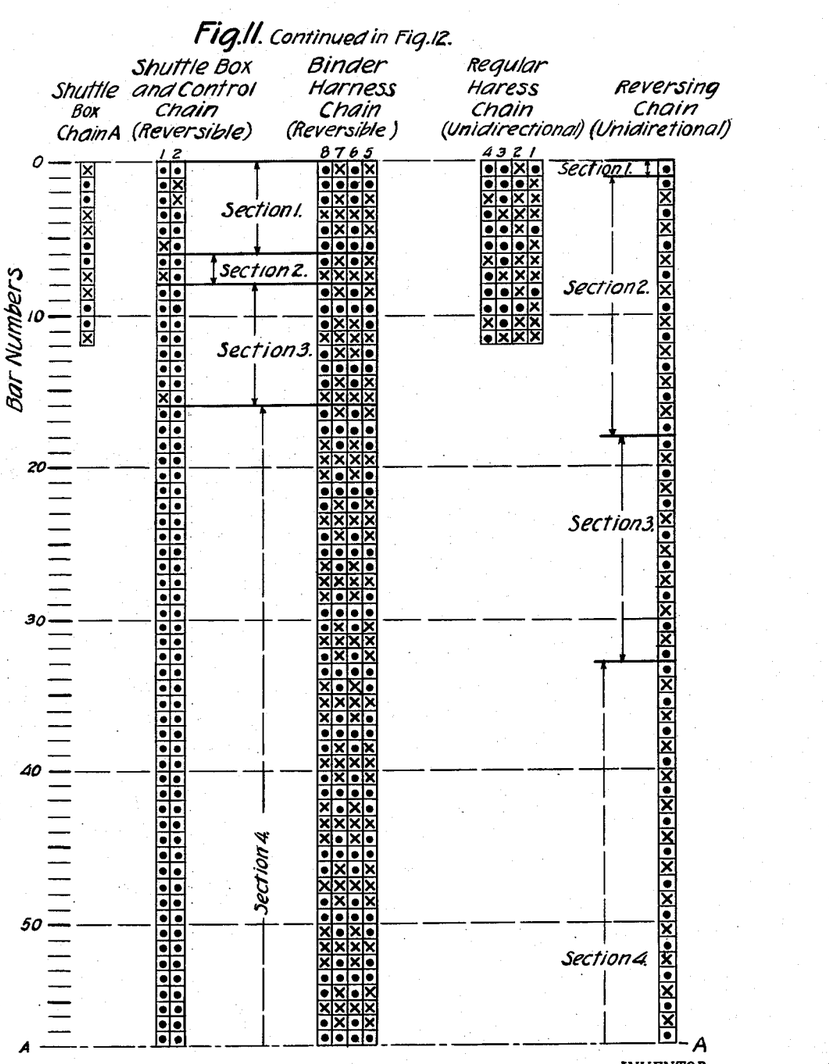
Figures 11 and 12 are complementary figures which, when ararnged end to end illustrate in chart form the composition and set-up of all the chains employed for control purposes, including the regular harness chain, the binder harness chain and the shuttle box and control chain, and the reversing chain.

The operation will be made clear from an examination of the chain chart of complementary Figures 11 and 12. At the first pick a sinker is effective in the control column which acts on lever 218 and a sinker of the reversing chain is effective. The control chain sinker means that the reversing chain will not be advanced. The sinker on the reversing chain will therefore remain in place. This means that the next step of the control chain will be in a forward direction to bring up bar two of the control chain. Since the control column contains nothing but sinkers for the first five bars, the reversing chain will not be advanced until the control for the sixth pick has been established. Since it is a sinker on the reversing chain which is being held in place, the operation of the control chain will be forward at every one of these steps.

The sixth bar of the control column brings up a roll, so that the reversing chain is now advanced a step to bring up bar two. Bar two of the reversing chain carries another sinker and therefore causes the control chain to move forward into its second section which begins with the seventh bar. The seventh bar of the control column carries a sinker, and hence the second bar of the reversing chain remains effective to cause the control chain to continue forward. This brings up the eighth bar of the control column which carries a roll. The roll causes the third bar of the reversing chain, which carries a roll, to become effective. At the ninth pick the control chain therefor moves backward to make its seventh bar again effective. Since bar seven of the control column carries a sinker, the reversing chain is not advanced and the roll on bar three of the reversing chain remains in place, causing the control chain to move backward another step, to again make bar six of the control column effective. The roll on bar six of the control column causes the reversing chain to be advanced to its bar four which carries a sinker, so that the control chain again moves forward to bring up bar seven.

There are two bars in the second section of the control column and seventeen bars in the second section of the reversing chain. The arrangement shown causes the bar sequence of the control chain to run 7—8, 7—6, 7—8, 7—6, until the forward sequence pair has been run through nine times and the reverse sequence pair has been run through eight times. It will be observed that each control column section has sinkers throughout except upon its last bar which carries a roll. Thus, the reversing chain is not advanced after a section has been entered until the last bar of the control chain section becomes effective. On the reversing chain, the bars throughout a section contain sinkers and rolls in alternation, each section including an odd number of bars and each one beginning and ending with a sinker. When the second section of the control chain has been run forward two steps for each sinker of the second section of the reversing chain and has been run backward two steps for each roll of the second section of the reversing chain (making thirty-four picks altogether), the next advance step of the reversing chain brings up the first bar of the third section of the reversing chain. Since this bar carries a sinker, the control chain continues forward through the next section of its control column until the last of the eight bars of that section comes up. The same principle described for section two now holds for section three. There are eight steps forward and eight steps back until the third section of the control chain has been traversed fifteen times making 120 picks altogether.

Similarly, the fifty six bars of section four of the control chain are traversed forty three times in response to the action of the reversing chain to take care of 2408 picks; the eight bars of the fifth section of the control chain are traversed twenty three times to take care of 184 picks, and finally the sixteen bars of the sixth section of the control chain are traversed nineteen times to take care of the final 304 picks. When the sixth section has been completed, the chains feed forward into their first sections to start the cycle over again. All the while, the regular harness chains have been advancing a step for each pick, regularly repeating the four-pick cycle which they are set up to follow. This is continued on into the second and subsequent blankets in harmony with the operation of the other mechanism.

It will be remembered that binder harness threads 5 and 7 take the place of regular harness threads 2 and that binder harness threads 6 and 8 take the place of regular harness threads 3. In sections 1, 2 and 6, therefore, it is essential to the maintenance of the established pattern that the 5 and 7 harnesses act in unison with the number 2 regular harness and that the 6 and 8 harnesses act in unison with the number 3 regular harness. This also means that in sections 1, 2 and 6, harnesses 5 and 7 must act in unison with one another and harness 6 and 8 must act in unison with one another. Comparison of the binder and regular harness chains pick by pick will show that these relationships are maintained.

It is also important that the binder harnesses 5 and 7 act in unison with one another and that the binder harnesses 6 and 8 act in unison with one another throughout section four where the threads controlled by these harnesses are used for binding. That this relationship is maintained can be readily established by inspection of the binder harness chart of Figures 11 and 12. In the third section where threads 5 and 6 are binding, the threads 7 and 8 are not, and in the fifth section where threads 7 and 8 are binding, the threads 5 and 6 are not, the control of the thread 5 differs from that of thread 7, and the control of thread 6 differs from that of thread 8.

Figure 8:
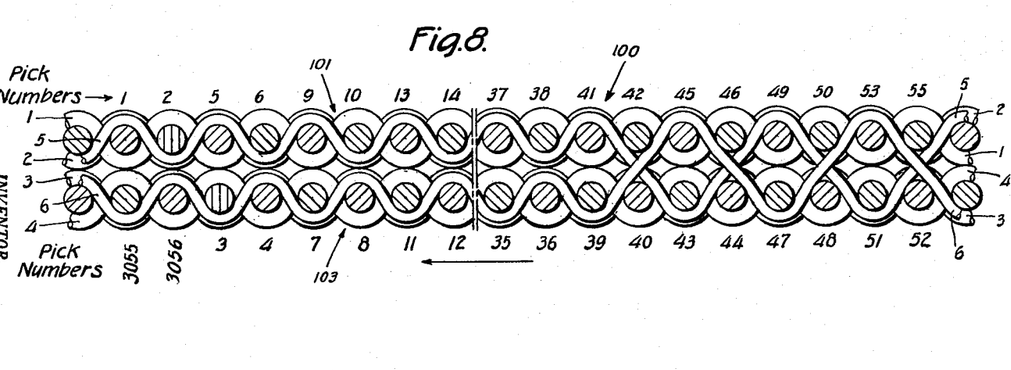
Figure 8 is a fragmentary sectional view taken upon the line 8—8 of Figure 10, looking in the direction of the arrows, the view showing certain weaving details of an electric blanket shell, which shell is shown by way of illustration as one available product of the novel mechanism.

The typical weaving and binding actions are illustrated in detail in Figure 8. Here threads 1 and 5, 6 and 4, are shown respectively as used in the regular weave at the beginning of the blanket and the binding performed by threads 5 and 6 is illustrated as section three is entered. The regular weave performed by threads 1 and 5, 6 and 4, is the same as that performed by threads 1 and 2, 3 and 4, or by threads 1 and 7, 8 and 4, while the binding performed by threads 5 and 6 in sections three and four is the same as that performed by threads 7 and 8 in sections four and five.

It should be noted that each control chain section includes an even number of bars while each section of the reversing chain contains an odd number of bars. It will be further observed that the sequence of harness settings from the last bar of one section to the last bar of the next is the same forward and backward.

It has been stated with a reservation that the shuttle box operating mechanism is conventional. This will now be explained.

The shuttle boxes are controlled by two vibrators in the same manner as the harness, and short cylinder gears 124x and 126x for operating one of the box vibrators are screwed to flanges on the same shafts 125 and 127 upon which the harness cylinder gears 124 and 126 (Fig. 9) are made fast.

Figure 13:
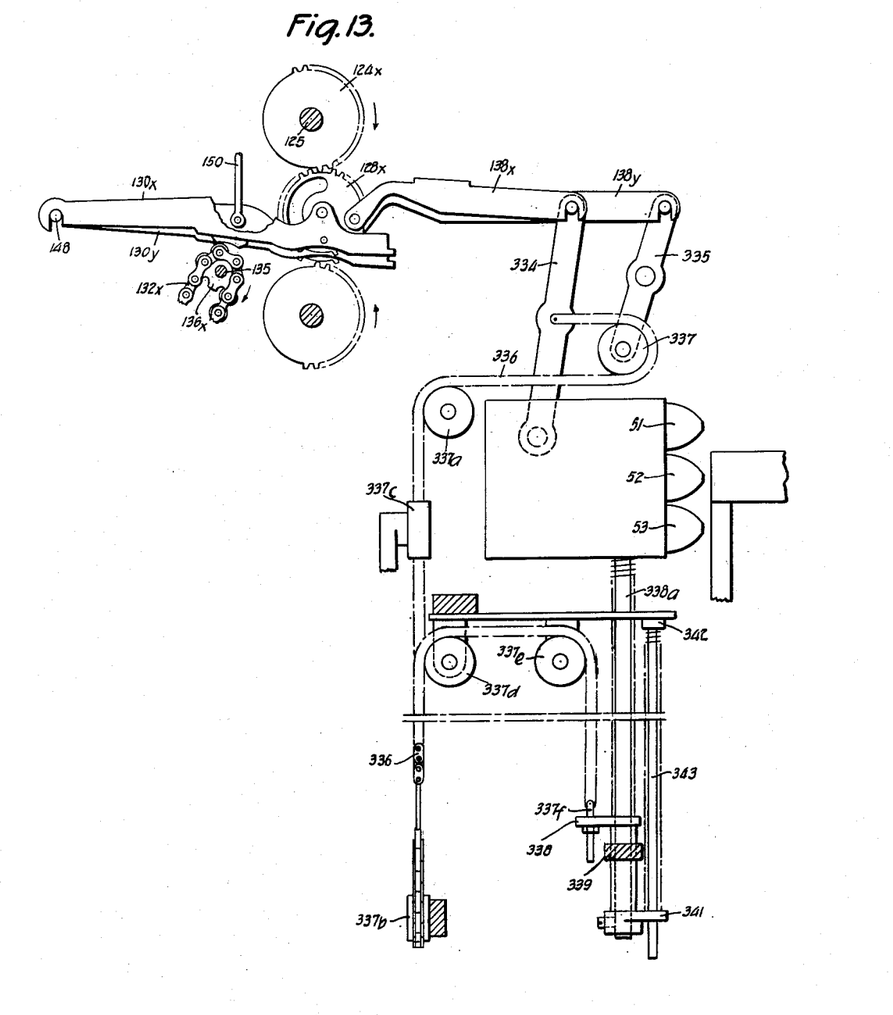
Figure 13 is a view in side elevation of the home side shuttle box and control mechanism immediately associated therewith.

One vibrator, 130x, 123x, 138x, which is shown under lever 222 in Fig. 3 is controlled by an auxiliary box chain 132x, as shown at 31 in the American Wool Handbook, 2nd edition, page 672, Fig. 5, which is driven by a gear 136x fast on the chain shaft 135 along with the regular harness chain gear 136, Figs. 9 and 13. The box chain 132x moves one bar to each pick of the loom.

The complete action controlled through vibrator lever 130x represents a one box lift, and is used to alternate the two white thread shuttles in the manner explained below.

With a sinker on chain 132x under vibrator lever 130x the number one shuttle 51 is in picking position for the outward pick. With another sinker on the next bar of chain 132x under vibrator lever 130x for the return pick the number one shuttle will return to its home box. With a roll under vibrator lever 130x the number two shuttle 52 is lifted into picking position for the next outward pick. As shown in Fig. 13 a roll has come under the lever 130x and the box is just about to be lifted in preparation for the outward pick of shuttle 52. With another roll on the next bar of chain 132x under vibrator lever 130x for the return pick the number two shuttle will return to its home box. The chain 132x is made to have a column of rolls and sinkers, two bars with rolls, and two bars with sinkers occurring in regular alternation. Four bars constitute a complete sequence which is repeated to the end of the blanket. At the end a line or mark for cutting the blankets apart is necessary. The cut line is made by a colored thread shuttle in a third shuttle box.

The third shuttle is lifted into picking position as explained below.

The other box vibrator, whose lever is designated 130y, is operated by lever 220 (Fig. 3) in the manner shown in Fig. 1. The action of vibrator lever 130y when a roll of column 214 is passed under lever 220 represents a two box lift. The third shuttle is lifted into picking position for the next outward pick after the return pick of the number two shuttle. This is accomplished by the cooperation of chain 132x with the box and control chain. As a first roll on column 214 of the box and control chain starts under the lever 220, a first sinker on chain 132x is starting to pass under vibrator lever 130x. This produces action on both vibrator levers 130x and 130y at the same time, with the vibrator lever 130x giving a one box lowering action simultaneously with the vibrator 130y giving a two box lifting action. The third shuttle is lifted to picking position and is held in this position for the outward and return pick by the sinkers on two bars of chain 132x and two rolls in column 214 of the box and control chain.

For the next outward and return pick, there are sinkers on box and control chain column 214 and rolls on the chain 132x to present number two shuttle for the next outward and return pick. At this point the regular shuttle alternating procedure is resumed.

The shuttle and box control chain has only two rolls in column 214, which are on consecutive bars 2 and 3 as described, and pass under the lever 220 only at the end and beginning of two consecutive blankets.

The lifting and lowering means for controlling the shuttle box is well understood and may be briefly described. Box vibrators 130x and 130y, working as explained, move levers 334 and 335. Lever 334 is pivoted at the lower end and holds box lifter chain 336 at a point on the lever about midway between the pivot and the vibrator connection. The movement given this lever by its vibrator represents a one box lift. Lever 335 is pivoted at the center and at its lower end is a sheave 337 around which the chain 336 passes from lever 334 to the drop box. The motion given lever 335 by its vibrator 130y represents a two box lift.

Box lifter chain 336 passes around sheaves 337a, 337b, 337c, 337d and 337e to an adjustable rod 337f which is fastened to a casting 338 on the box lifter rod 338a. This casting includes a sleeve portion which has a sliding fit on the rod 338a and in a rocker 339. A spring 340 surrounds rod 338a and holds casting 338 down against a collar 341 which is adjustably fixed on the lower end of rod 340a. A spring 342 assists gravity in pushing the box down. The spring 342 is guided by a rod 343, the upper end of which is pressed upward against the end by spring 342. The rod 343 passes downward through an opening in the collar 341. The spring 342 pushes down on the collar 341.

The use of two shuttles operating alternately has some well-known advantages: first, the blending and mixing of the filling threads to produce a more even and uniform appearance in the fabric; second, the shuttle life is greater due to avoidance of the friction heat which is produced when one shuttle is used; and third, the storage capacity of the magazine for the filling bobbins is doubled.

As far as the construction of the electric blanket is concerned, one white thread shuttle passing through the shed of the lower layer and returning through the shed of the upper layer, and vice versa, will produce a satisfactory structure, but with the advantages as described above the two shuttle alternating procedure is considered preferable.

When work is being performed which calls for selection between three white threads the run may be removed from vibrator lever 136x, and the lever may be connected through a link 150 with lever 222. Rolls and sinkers as required may then be provided in column 216 of the shuttle and control chain.

I have described what I believe to be the best embodiments of my invention. I do not wish, however, to be confined to the embodiments shown, but what I desire to cover by Letters Patent is set forth in the appended claims.

I claim:

1. In a loom, the combination with control mechanism for one set of harnesses including vibrator levers therefor, and a unidirectional harness chain engageable with the vibrator levers from below, a control mechanism for a special set of harnesses including vibrator levers therefor, operating levers above the vibrator levers for the special harnesses and connected from overhead therewith, special harness chains engageable with said operating levers, mechanism for driving the special harness chains in either forward or reverse direction, and means for automatically determining the direction of drive of the special harness chains at every pick of the loom.

2. In a loom, the combination with control mechanism for one set of harnesses including vibrator levers therefor, and a unidirectional harness chain engageable with the vibrator levers from below, a control mechanism for a special set of harnesses including vibrator levers therefor, operating levers above the vibrator levers for the special harnesses and connected from overhead therewith, special harness chains engageable with said operating levers, mechanism for driving the special harness chains in either forward or reverse direction, and means for automatically determining the direction of drive of the special harness chains at every pick of the loom, a shuttle box vibrator for selecting between two shuttle boxes, a shuttle box chain column connected for operation in unison with the special harness chain in forward and reverse directions, and means for selecting the shuttle to be active at alternate pairs of picks.

3. In a loom, in combination, harness control mechanism including a harness chain, a drive gear for said chain, a chain having a shuttle box control column, a gear for driving the latter chain, said gears having interfitting parts to cause said chains to turn in unison but to be readily severable from one another, and multiplying means for driving at least one of said gears in forward and reverse directions.

4. In a loom, in combination, harness control mechanism comprising a harness chain, shuttle box control mechanism comprising a chain having a shuttle box column of rolls and sinkers, and a vibrator controlled thereby, means for driving said chains in unison in forward and reverse directions, setting a step for every pick, a second shuttle box chain having a column of rolls and sinkers, means for driving said second shuttle box chain unidirectionally, a step for every pick, and a vibrator controlled by said second chain, said shuttle box control mechanism including box operating means under the joint control of said vibrators.

5. In a loom for weaving a tubular structure, in combination, a pair of shuttles, means for causing the shuttles to execute pairs of consecutive picks in alternation, a set of harnesses dividing part of the warp threads at least into four groups, and control mechanism for producing a repeating four pick harness cycle, comprising means for causing only the first harness to be raised during the first outward pick, means for causing all but the second harness to be raised during the first return pick, means for causing all but the third harness to be raised during the second outward pick, and means for causing only the fourth harness to be raised during the second return pick, whereby one filler thread is caused to define a flattened right hand spiral and the other a flattened left hand spiral, with the spirals crossing one another as they pass from layer to layer at one side of the tubular structure and connecting the layers to one another at that side.

6. In a loom for weaving a tubular structure, in combination, a pair of shuttles, means for causing the shuttles to execute pairs of consecutive picks in alternation, a set of harnesses dividing part of the warp threads at least into four groups, and control mechanism for said harnesses, causing the first shuttle at its first or outward pick to pass above all but the first group of the warp threads and at its second or return pick to pass above only the second group of the warp threads, and causing the second shuttle at its first or outward pick to pass above only the third group of the warp threads and at its second or return pick to pass above all but the fourth group of the warp threads, whereby one filler thread is caused to define a flattened right hand spiral and the other a flattened left hand spiral, with the spirals crossing one another as they pass from layer to layer at one side of the tubular structure and connecting the layers to one another at that side, a second set of harnesses dividing other warp threads into additional groups, control mechanism therefor comprising a reversible chain and reversing means therefor, the chain being constructed and arranged at times to confine certain of the latter warp threads to the upper layer and others to the lower layer, and at other times to cause the latter warp threads to pass back and forth between the layers for binding the layers to one another in selected zones.

7. In a loom for weaving a tubular blanket shell, in combination, a set of at least four regular harnesses carrying warp threads, a harness chain controlling said harnesses and having a uniformly repetitive pattern which confines certain of the warp threads to the upper layer of the shell and the other warp threads to the lower layer of the shell, means for advancing the chain uniformly, one step at each pick, a set of special harnesses carrying binder warp threads, a reversible binder harness chain for causing the binder threads to be confined in certain sections to the respective shell layers and in other sections to pass back and forth from layer to layer, a control chain, a reversing chain, and means causing the control and reversing chains to interact upon one another and jointly to determine the direction of operation of the reversible harness chain at all times.

8. In a loom for weaving a tubular blanket shell, in combination, a set of at least four regular harnesses carrying warp threads, a harness chain controlling said harnesses and having a uniformly repetitive pattern which confines certain of the warp threads to the upper layer of the shell and the other warp threads to the lower layer of the shell, means for advancing the chain uniformly, one step at each pick, a set of special harnesses carrying binder warp threads, a reversible binder harness chain for causing the binder threads to be confined in certain sections to the respective shell layers and in other sections to pass back and forth from layer to layer, a control chain, a reversing chain, the control and reversing chains interacting upon one another and jointly acting to cause the binder harness chain to be run forward and backward through certain of its sections until an odd number of traverses of a section has been effected, and then to pass on to a succeeding section.

9. In a loom for weaving a tubular blanket shell, in combination, a set of at least four regular harnesses carrying warp threads, a harness chain controlling said harnesses and having a uniformly repetitive pattern which confines certain of the warp threads to the upper layer of the shell and the other warp threads to the lower layer of the shell, means for advancing the chain uniformly, one step at each pick, a set of special harnesses carrying binder warp threads, a reversible binder harness chain for causing the binder threads to be confined in certain sections to the respective shell layers and in other sections to pass back and forth from layer to layer, a control chain, means connecting the control chain to run in unison with the binder harness chain, means for driving the binder harness chain and the control chain a step in one direction or the other at every pick, reversing mechanism controlling the driving direction of the control and binder harness chains at every pick, and including a unidirectionally driven reversing chain, means for driving the reversing chain forward step by step at selected picks, and means responsive to the control chain for determining at every pick whether the reversing chain shall be advanced or shall remain idle.

10. In a loom for weaving a tubular blanket shell with the layers bound together in certain longitudinal zones, the combination with a set of at least four regular harnesses carrying warp threads which, with definite exceptions, are disposed in regularly repeating order laterally of the loom, control mechanism for said regular harnesses imposing a uniformly repetitive control pattern such that the threads of one-half the regular harnesses are confined to the upper blanket shell layer and the threads of the other half of the regular harnesses are confined to the lower blanket shell layer, said control mechanism including a control chain and means for automatically advancing the control chain a step at each pick, a set of binding harnesses carrying binding warp threads in certain longitudinally extending zones, each as a substitute for one of the excepted regular harness threads, special harness control mechanism for causing the binder harnesses in certain sections of limited length to duplicate the action of the respective regular harnesses for which they are substitutes and for varying the action of said binder harnesses in other sections to cause the binder threads to pass back and forth from layer to layer for binding the layers together, said control mechanism including control and binder harness chains comprising rolls and sinkers, means connecting said control and binder harness chains for operation in unison, means for driving said control and binder harness chains forward and backward, a step at each pick, a reversing chain, means for driving the reversing chain unidirectionally but only at selected picks, means responsive to the control chain for determining the picks at which the reversing chain will be advanced, and means responsive to the reversing chain for determining at each pick whether the control and binder harness chains will be operated forward or backward.

GRAYDON ROBINSON.

References Cited in the file of this patent
UNITED STATES PATENTS

| Number | Name | Date |
|---|---|---|
| 469,210 | Hollingsworth | Feb. 16, 1892 |
| 490,890 | Wattie | Jan. 31, 1893 |
| 620,861 | Wattie | Mar. 7, 1899 |
| 1,073,635 | Ryon | Sept. 23, 1913 |
| 1,852,083 | Jennings | Apr. 5, 1932 |